(No Model.)
G. G. F. BOSWELL.
SQUARE.
No. 527,035. Patented Oct. 2, 1894.
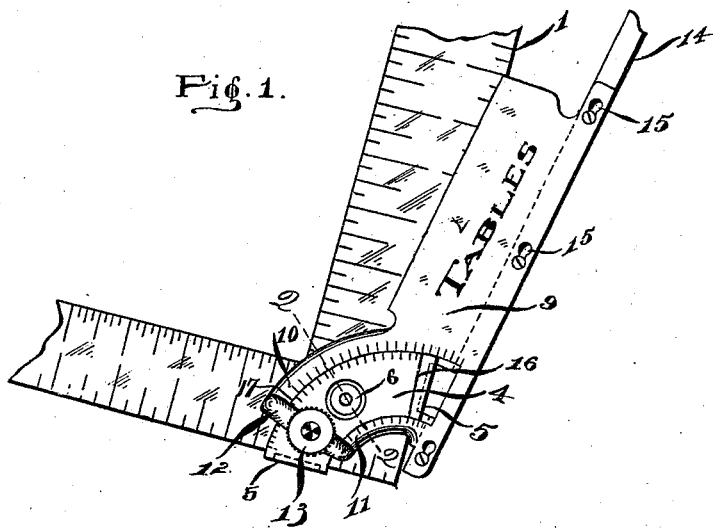
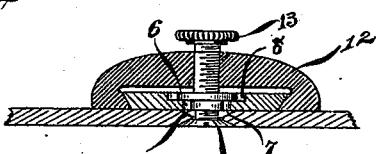
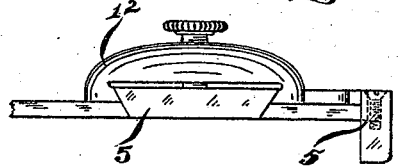
WITNESSES:
Geo. C. Conner
Lela Monroe
INVENTOR
George G. F. Boswell,
BY
V. H. Lockwood
ATTORNEY.

UNITED STATES PATENT OFFICE.

GEORGE G. F. BOSWELL, OF INDIANAPOLIS, INDIANA, ASSIGNOR OF ONE-HALF TO WILLIAM A. BRUCE, OF SAME PLACE.

SQUARE.

SPECIFICATION forming part of Letters Patent No. 527,035, dated October 2, 1894.

Application filed April 2, 1894. Serial No. 506,101. (No model.)

*To all whom it may concern:*

Be it known that I, GEORGE G. F. BOSWELL, of Indianapolis, county of Marion, and State of Indiana, have invented certain new and useful Improvements in Squares; and I do hereby declare that the following is a full, clear, and exact description thereof, reference being had to the accompanying drawings, in which like figures refer to like parts.

My invention relates to a combination square made by combining with the ordinary flat steel square an attachment enabling one to lay off angles other than right angles, and is designed especially for use in laying off rafters. It can, however, be used for any other purpose in carpentry as well as in masonry where it is desired to lay off varied angles.

The nature of my invention will appear fully from the following description and the accompanying drawings.

Figure 1 is a plan view of my square, the arms of the steel square being broken away. Fig. 2 is a cross section of my attachment on the lines 2—2 Fig. 1. Fig. 3 is a cross section of my entire square on the same line, the blade having been rotated about forty-five degrees. Fig. 4 is an end view of my square, one arm of the steel square being broken away.

In detail, 1 is the ordinary steel square in which I bore a hole as shown at 2 in Fig. 3. Through this hole, I secure my attachment by means of a screw bolt 3. The hole 2 is beveled on each side so that the attachment can be placed on either side of the steel square 1. Across the corner of the steel square 1 is secured the segmental guide plate 4 which has on each end of it flanges 5 which enable it to be readily put in the proper place, as the guide plate 4 is slipped onto the corner of the square until the lips or flanges meet the edges of the square. The guide plate 4 is secured to the square by the screw bolt 3 screwing into a flange nut 6. The flange nut 6 fits in an aperture 7 in the guide plate 4 which aperture is larger than the diameter of the nut. The flange of the nut is also adapted to fit in a recess 8 in the top of the guide plate 4 which recess is larger than the top of the nut. The purpose of this enlargement of the aperture 7 and recess or seat 8 is to enable the guide plate 4 to be clamped on to the steel square when the hole 2 is not accurately located. My attachment is intended to be readily combined with any square and no alteration is made in the square excepting the boring of the hole 2; but if this hole be not accurately located, still the nut 6 and the bolt 3 will have sufficient play to enable the attachment to be clamped on as indicated. Of course, the cap of the nut 6 as well as the head of the screw bolt 3 must be flush with the surface of the instrument. The edges of the guide plate 4 are beveled as shown in Fig. 2.

9 is a blade made of metal preferably and having on one end a table of measurement. The other end is provided with two guide arms 10 and 11 united at their outer ends by the bracket 12. The arms 10 and 11 are curved and beveled so that they will accurately embrace the edges of the guide plate 4 whereby the blade 9 may be rotated to any angle. In the bracket 12 is a set screw 13 adapted to clamp the blade 9 in any desired position. Along the outer edge of the blade 9 is a detachable gage 14 secured preferably by screws fitting in tapered slots 15 whereby the gage can be removed instantly when desired. It will always be removed in masonry or otherwise when a flat square is desired. The rule line is the inner line of this gage 14 and the corresponding inner lines of the blade 9. These inner lines will always extend radially from the corner of the steel square 1 and point to that corner.

On the shorter guide arm 11 of the blade 9, I mark a pitch scale for cutting principal rafters. On the long guide arm 10, and on the outer edge of the guide plate 4, I locate pitch scales for cutting jack, and hip and valley rafters. The marks 16 and 17 are the main marks with which the scale marks are to register. These scales are made according to the well understood rules for determining the angles at which the various kinds of rafters should be cut.

The operation of this device is well understood and needs no explanation here. The advantages of it consist in the ability to make a superior square adapted to make varied angles by combining a simple attachment with the old-fashioned square. The device is so constructed that this attachment or its detachment can always be made easily and so that the instrument will be precise.

What I claim as my invention, and desire to secure by Letters Patent, is the following:

1. In combination with a square, a segmental guide plate provided with end flanges adapted to center such guide plate on the corner of the square, means of securing the same to the square, and a blade rotatably mounted on such guide plate, substantially as shown and described.

2. In combination with a square, provided with a hole, a guide plate provided with end flanges, and a central aperture, a bolt adapted to secure the guide plate to the square, the diameter of the bolt being less than the aperture in the guide plate, and a blade provided with curved guide arms adapted to embrace and be movable on the edges of such guide plate.

3. In combination with a square, a segmental guide plate provided with beveled edges and adjustably secured to the square, and blade provided with curved arms having beveled edges adapted to fit and be movable on the guide plate, a bracket connecting such guide arms, and a set screw operating in such bracket and adapted to clamp the blade in any desired position.

4. In combination with a square, a segmental guide plate adjustably secured to the square, a blade provided with curved arms adapted to embrace and be movable on the guide plate, means of clamping such blade to the square, and a gage detachably secured to the edge of the blade.

5. In combination with a square, a segmental guide plate provided with beveled edges and adjustably secured to the square, and a blade provided with curved arms having beveled edges adapted to fit and be movable on the guide plate, a bracket connecting such guide arms, and a set screw operating in such bracket and adapted to clamp the blade in any desired position, and suitable pitch scales on the edges of the guide plate and guide arms.

In witness whereof I have hereunto set my hand this 27th day of March, 1894.

GEORGE G. F. BOSWELL.

Witnesses:
V. H. LOCKWOOD,
G. C. CONNER.